(12) United States Patent
Bresemann

(10) Patent No.: US 7,984,516 B2
(45) Date of Patent: Jul. 19, 2011

(54) METHOD AND APPARATUS FOR PROTECTION OF VOICE OVER INTERNET PROTOCOL SOFTWARE

(75) Inventor: David P. Bresemann, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 1357 days.

(21) Appl. No.: 11/514,050

(22) Filed: Aug. 31, 2006

(65) Prior Publication Data

US 2008/0056237 A1 Mar. 6, 2008

(51) Int. Cl.
- G06F 7/04 (2006.01)
- G06F 17/30 (2006.01)
- G06F 21/00 (2006.01)

(52) U.S. Cl. ........... 726/33; 726/26; 726/31; 726/32; 726/35; 705/55; 705/58

(58) Field of Classification Search .......... 726/26, 726/31, 32, 33, 35; 705/55, 58
See application file for complete search history.

(56) References Cited

U.S. PATENT DOCUMENTS

| | | | |
|---|---|---|---|
| 6,715,079 B1 | 3/2004 | Maytal et al. ............ 713/194 |
| 6,731,751 B1 * | 5/2004 | Papadopoulos ......... 379/399.01 |
| 6,819,710 B1 | 11/2004 | Dupuis ................. 375/222 |
| 6,891,935 B1 | 5/2005 | Bresemann et al. ....... 379/93.05 |
| 6,922,469 B2 | 7/2005 | Scott et al. ............ 379/399.01 |
| 7,188,255 B1 * | 3/2007 | Toh et al. .............. 713/191 |
| 7,454,169 B2 * | 11/2008 | Soerensen et al. ......... 455/26.1 |
| 2002/0073325 A1 * | 6/2002 | Ho et al. ................ 713/189 |
| 2002/0164003 A1 * | 11/2002 | Chang et al. ........... 379/93.05 |
| 2003/0005274 A1 | 1/2003 | Bresemann et al. ......... 713/1 |
| 2003/0035471 A1 * | 2/2003 | Pitsoulakis ............... 375/222 |
| 2003/0072436 A1 | 4/2003 | Eckhoff et al. ......... 379/399.01 |
| 2003/0161453 A1 * | 8/2003 | Veschi ................ 379/93.05 |
| 2004/0003271 A1 * | 1/2004 | Bourne et al. ........... 713/193 |
| 2004/0059938 A1 * | 3/2004 | Hughes et al. ........... 713/200 |
| 2005/0050347 A1 * | 3/2005 | Hsuan ................. 713/200 |
| 2005/0132357 A1 * | 6/2005 | Shell et al. ............ 717/174 |
| 2005/0262337 A1 * | 11/2005 | Ziesmer et al. ............. 713/2 |
| 2006/0072552 A1 * | 4/2006 | Shnitzer et al. ........... 370/352 |
| 2006/0077968 A1 * | 4/2006 | Pitsoulakis et al. ........ 370/352 |
| 2006/0203800 A1 * | 9/2006 | Nejah ................ 370/352 |
| 2006/0239425 A1 * | 10/2006 | Hurst et al. ........... 379/93.01 |
| 2007/0025338 A1 * | 2/2007 | Benditovich et al. ........ 370/352 |
| 2007/0206567 A1 * | 9/2007 | Elias et al. ............. 370/352 |
| 2007/0286098 A1 * | 12/2007 | Combs et al. ........... 370/259 |
| 2007/0286171 A1 * | 12/2007 | Guan ................. 370/356 |

OTHER PUBLICATIONS

Silicon Laboratories, "Si3216 Wideband ProSLIC—Programmable SLIC/Wideband CODEC With Ringing and Battery Voltage Generation," Sep. 2002, pp. 1-2.
Silicon Laboratories, "Broadband & Voice Telephony Solutions," Apr. 2004, pp. 1-2.

* cited by examiner

Primary Examiner — Michael J Simitoski
(74) Attorney, Agent, or Firm — Trop, Pruner & Hu, P.C.

(57) ABSTRACT

In one embodiment, the present invention includes a method for executing an application to perform voice over Internet protocol (VoIP) telephony, requesting a hardware key from a line interface device, comparing the hardware key to a software key associated with the application, and enabling the VoIP telephony if the keys match.

17 Claims, 6 Drawing Sheets

US 7,984,516 B2

METHOD AND APPARATUS FOR PROTECTION OF VOICE OVER INTERNET PROTOCOL SOFTWARE

FIELD OF THE INVENTION

The present invention relates to voice-over-Internet protocol (VoIP) communication, and more particularly to software control of such communication.

BACKGROUND

Voice over Internet protocol (VoIP) telephony is a growing means by which to communicate. VoIP operates by taking voice signals (e.g., from a telephone or other input device) and converting them into digital signals for transmission via a computer network, e.g., the Internet. At a receiving end, the digital voice signals are then converted back into analog signals for the called party, either by telephone, computer or other output means.

VoIP offers many advantages over traditional telephone systems. First, VoIP can provide for free telephone communication, even for long distance service. Second, the resources such as bandwidth needed for communications may be significantly reduced, as the packet-based communication of VoIP is far more efficient than the traditional circuit-based switching network of a telephone system.

Different manners of communicating via VoIP have appeared. For instance a consumer can use a traditional telephone to place VoIP calls by using an adapter device, referred to as an analog telephone adapter (ATA), that is coupled to the telephone. The ATA is in turn coupled to a modem, router or other interconnection to the Internet. The ATA typically includes analog-to-digital converter (ADC) circuitry. Other VoIP services may use a specialized Internet protocol (IP) telephone that includes a built-in ADC/digital-to-analog (DAC) or other codec functionality to provide a direct connection to a router or other gateway to the Internet. Still further, VoIP may be effected using computer-to-computer connections in which computers outfitted with an appropriate input device (e.g., a microphone) and output device (e.g., speakers) allows a user to communicate using standard audio components of the system, such as a sound card including codec features. Typically, the computer will also include dedicated software to handle VoIP communications. Certain modems and ATAs include additional telephone-based circuitry, such as subscriber line interface circuitry (SLIC). Such a SLIC is used to interface with the telephone system.

In various VoIP applications, software may be implemented on a computer, for example, to enable the VoIP. Typically, this software is associated with a particular manufacturer of an ATA, IP telephone or other specialized hardware for providing the VoIP telephony. However, as independent software vendors enter the VoIP market with software to perform VoIP telephony, concerns with respect to piracy or other malicious activities are raised.

SUMMARY OF THE INVENTION

In one aspect, the present invention includes a method for executing an application to perform voice over Internet protocol (VoIP) telephony, requesting a hardware key from a line interface device, comparing the hardware key to a software key associated with the application, and enabling the VoIP telephony if the keys match. If instead, the keys do not match, VoIP telephony may either be prevented or degraded. Still further, a second hardware key of the line interface device may be associated with upgrade software, and upgraded VoIP telephony may be enabled if the second hardware key and the upgrade software are associated when a check is made during initiation of the upgrade software.

Another aspect of the present invention is directed to a subscriber line interface circuit (SLIC) including a codec to code and decode voice data for VoIP telephony, a line interface to interface the SLIC to a connection for the VoIP telephony, and a storage to store one or more hardware identifiers for the SLIC. The SLIC may be adapted within a computer system, and may provide the hardware identifier upon request of a VoIP application program.

Still further, the present invention includes a system having a processor, a first integrated circuit (IC) including a modem to perform data communication between the system and a data line, and a first storage to store a first hardware identifier for the first IC, and a second IC including a codec to code and decode audio data and voice data for VoIP telephony and a second storage to store a second hardware identifier for the second IC. The system further may include a storage medium in the system to store an application program to perform the VoIP telephony using subscriber interface circuitry of the first IC and the codec of the second IC.

Further embodiments are directed to a computer-readable medium including instructions to request a first hardware identifier from a first component including a SLIC, compare the first hardware identifier to a first soft identifier associated with a VoIP application program, and provide a first level of VoIP telephony if the identifiers correspond and a second level of the VoIP telephony if they do not. The instructions may further cause transmission of a message to a remote entity if the hardware identifier and the soft identifier do not correspond. The instructions may still further enable requesting of a second hardware identifier from a second component including codec circuitry, and execution of the VoIP telephony using the SLIC of the first component and the codec circuitry of the second component if the first and second hardware identifiers correspond to soft identifiers.

Embodiments of the present invention may be implemented in appropriate hardware, firmware, and software. To that end, a method may be implemented in hardware, software and/or firmware to perform the specified functions. The method may be performed on a variety of systems, including a computer system such as a personal computer, notebook computer or personal digital assistant, although the scope of the present invention is not so limited.

DETAILED DESCRIPTION

In various embodiments, keys may be employed within a system to protect software associated with a VoIP application. Specifically, such keys may be used to protect a soft VoIP software application by associating an instance of the application with a particular hardware system. In some embodiments, a hardware key and a software key may be provided. These keys may be accessed to determine whether VoIP software associated or assigned to a particular hardware platform is in fact associated with that platform. In such manner, software protection is provided. In some embodiments, the hardware key may be stored within an integrated circuit, such as a SLIC which may be, for example, integrated within a computer system as a motherboard component or as a component on a peripheral card. In other implementations, the SLIC may be integrated within an external peripheral device coupled to the computer system, such as a modem, ATA or the like.

In some embodiments, a VoIP application may request and obtain the hardware key and compare it to a software key associated with the application. Upon a match, the VoIP application may be enabled, while a mismatch may disable the VoIP application. In other embodiments a hardware/software key match may enable one or more features, e.g., advanced features within the VoIP application.

Figure 1:
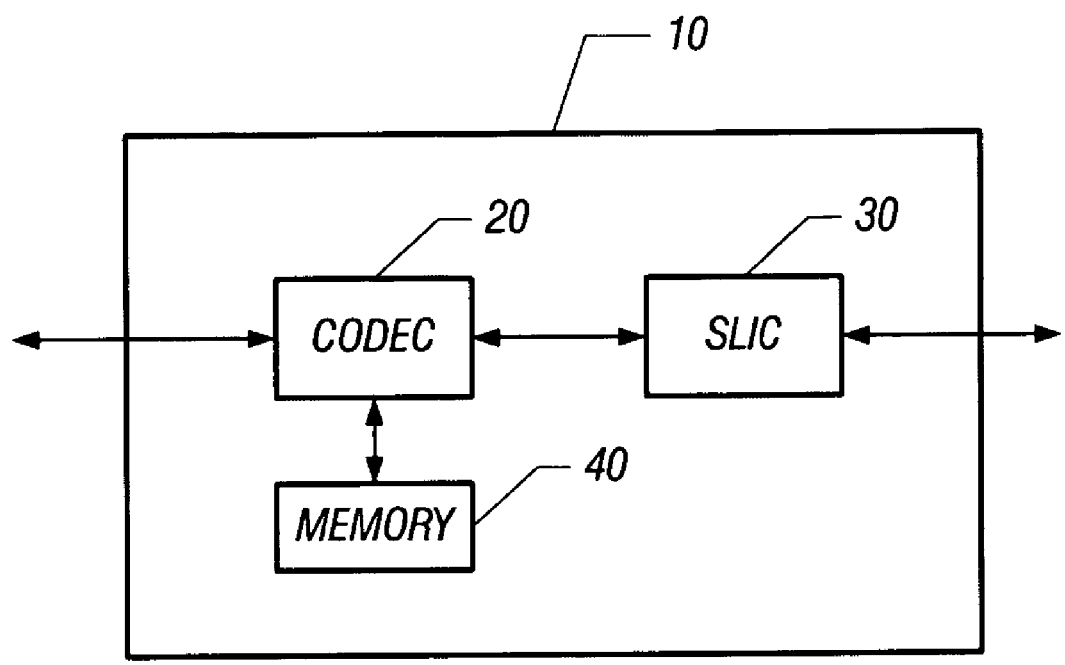
FIG. 1 is a block diagram of an interface circuit in accordance with one embodiment of the present invention.

Referring now to FIG. 1, shown is a block diagram of an interface circuit 10 in accordance with one embodiment of the present invention. As shown in FIG. 1, interface circuit 10 may be a single integrated circuit that includes analog and digital circuitry to perform typical subscriber line interface circuit (SLIC) functions (e.g., BORSCHT) functions, along with codec functionality. Accordingly, interface circuit 10 can be used in a variety of different systems to provide an interface between subscriber equipment and various network components. For example, it could be integrated into a modem which may further include a digital signal processor (DSP) and controller, where such functions can be implemented in software. Or it can be integrated in a computer system that provides similar functionality via software.

Still referring to FIG. 1, interface circuit 10 may include a codec 20 that may perform coding/decoding functions. As such, codec 20 may perform analog-to-digital and digital-to-analog conversion functions. In some embodiments, additional functionality may be present in interface circuit 10 to perform other signal processing functions such as pulse code modulation (PCM) or other such functions. In different implementations, codec 20 may interface with a variety of different devices, such a system processor of a modem or computer system in which interface circuit 10 is located. Codec 20 is further coupled to a SLIC circuit 30 that may perform various SLIC functionality and provide an interface to subscriber equipment.

As further shown in FIG. 1, a memory 40 may be coupled to codec 20. Memory 40 may take various forms in different embodiments. For example, memory 40 may be one of a number of different types of non-volatile memories, such as a flash memory, an electrically erasable programmable read only memory (EEPROM) or another such memory. As will be described further below, memory 40 may include one or more storage locations for storage of hardware identifier(s) associated with interface circuit 10. In different implementations, the hardware identifier(s) stored in memory 40 may be set upon manufacture of the device. Alternately, the identifier may be programmed by a supplier of a communication device, such as a modem, router or the like that incorporates interface circuit 10. Still further, the hardware identifier(s) may be programmed in the field, for example, in connection with downloading of a particular software application with which the hardware identifier is to be associated, as discussed further below. Also, hardware identifiers stored in memory 40 may take the form of allocated and unallocated identifiers. That is, one or more identifiers may be allocated when interface circuit 10 is configured in a system, while one or more identifiers may remain unallocated until a future time, e.g., when an upgrade occurs (as discussed further below). While shown with this particular implementation in the embodiment of FIG. 1, it is to be understood that many variations and modifications are possible and an interface circuit including one or more hardware identifier(s) may take many different forms.

Figure 2:
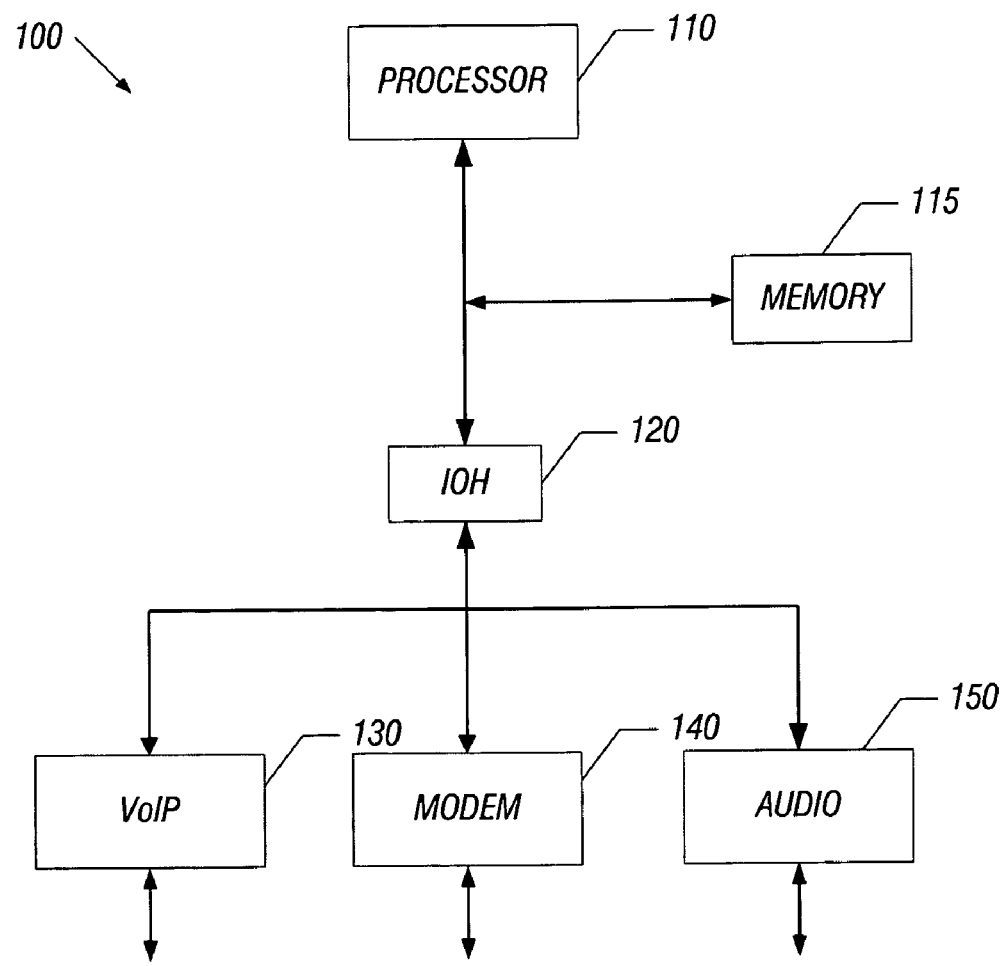
FIG. 2 is a block diagram of a system in accordance with one embodiment of the present invention.

Referring now to FIG. 2, shown is a block diagram of a system in accordance with one embodiment of the present invention. As shown in FIG. 2, system 100 may be a computer system, such as a personal computer (PC). The PC may take various forms including a desktop, laptop or even a server-based platform in different embodiments. System 100 includes a processor 110 which may be a central processing unit (CPU). Processor 110 is coupled to a hub interface 120, which in one embodiment may be an input/output (I/O) controller hub, to interface with many different types of I/O devices or other peripherals. Of course, intermediate components may be coupled between processor 110 and I/O hub 120, such as a memory controller hub, for example. Accordingly, a memory 115, which is shown coupled between processor 110 and I/O hub 120, may instead be coupled to a memory controller hub, if present. In many implementations, memory 115, which may be a dynamic random access memory (DRAM) may store a VoIP application to be executed by processor 110. Furthermore, as will be discussed below a software key may be stored within the VoIP application or another location in memory 115 or another memory of the system for use in authentication operations.

In the embodiment shown in FIG. 2, I/O hub 120 is coupled to a VoIP device 130, a modem 140 and an audio device 150. While shown with these particular components in the embodiment of FIG. 2, the scope of the present invention is not so limited and in other embodiments more or different components may be present. Still further, it is to be understood that system 100 may include many other components, such as other memories, hard drive and other well-known devices.

In one embodiment, VoIP device 130 may be a SLIC that includes a codec and circuitry to handle SLIC functions. In various implementations, VoIP device 130 may include at least one hardware identifier stored in a non-volatile memory of the device. VoIP device 130 may be coupled to a telephone line, for example. Modem 140 may include a codec and related modulation/demodulation circuitry. Furthermore, in some embodiments modem 140 may include a data access arrangement (DAA) device.

Still referring to FIG. 2, system 100 may further include audio device 150, which may take the form of a sound card. In some embodiments, audio device 150 may include a multi-channel codec to provide an interface to audio I/O devices, such as a speaker system, a microphone and the like. In some embodiments, audio device 150 may be a high definition audio-enabled device. In various implementations, devices 130, 140 and 150 may all be located on a motherboard of the system, or one or more devices may be included on an adapter card, or even in an external device coupled to the system.

Further, while shown as separate components in the embodiment of FIG. 2, other implementations may combine this functionality into fewer components. For example, in some implementations in a single codec may be shared among multiple functions. A single codec, which may be a codec that can handle multiple channels of, e.g., 16-bit data, may be coupled to independent components for providing SLIC functionality and DAA functionality. Furthermore, the codec may also be coupled to a path to provide communication of audio input/output data. In some implementations, the codec may take the form of a separate integrated circuit. However, in other implementations single codec functionality of an IC may be coupled to additional IC functionality to enable on-chip SLIC and/or DAA functionality, in addition to providing an audio path.

Figure 3:
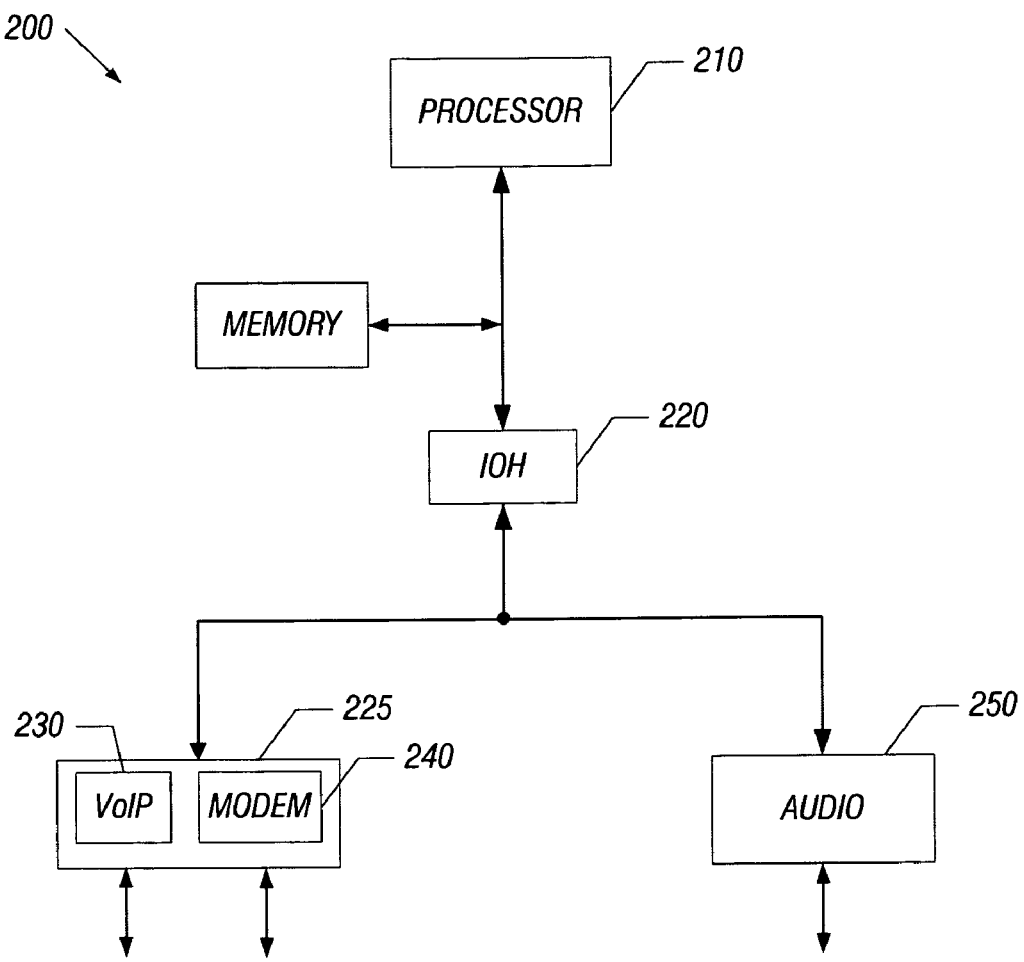
FIG. 3 is a block diagram of a system in accordance with another embodiment of the present invention.

Referring now to FIG. 3, shown is a block diagram of a system in accordance with another embodiment of the present invention. System 200 may be a computer system, such as a PC or other type of platform. System 200 includes a processor 210 which may be a CPU. A memory 215 is shown coupled to processor 210. Memory 215 may store a VoIP application for execution by processor 210, and may further include a software key. Processor 210 is coupled to a hub interface 220 such as an I/O hub. In the embodiment shown in FIG. 3, I/O hub 220 is coupled to a device 225 such as an IC that, as will be described further below, includes VoIP and modem functionality. I/O hub 220 is also coupled to an audio device 250. Of course, while shown with these particular components in the embodiment of FIG. 3, the scope of the present invention is not so limited and in other embodiments more or different components may be present. Still further, it is to be understood that system 200 may include many other components, such as additional memories, hard drive and other well-known devices.

As shown in FIG. 3, IC 225 may be a single integrated circuit, which may be integrated on a motherboard of the system. IC 225 may include both VoIP and modem functionality. Accordingly, device 225 may include VoIP circuitry 230 that includes codec functionality along with SLIC functionality. Furthermore, device 225 includes a modem portion 240 that includes modem functionality providing for codec, modulation, and DAA functionality. Device 225 may also include non-volatile storage to store one or more hardware identifiers, use of which is described further below. In some embodiments, device 225 may further handle at least certain audio functions. For example, a codec portion of VoIP circuitry 230 may handle processing of audio data, such as multi-channel high definition audio data.

Still referring to FIG. 3, system 200 may be further include audio device 250, which may be an IC integrated on a motherboard of the system, for example. In some embodiments, audio device 250 may include a multi-channel codec to provide an interface to a speaker system or other audio I/O devices. However, in other implementations based on software present in the system (or more specifically within device 225 and audio device 250), at least certain audio data, such as certain channels of multi-channel audio may be processed through codec circuitry of device 225. In still other implementations, device 225 may use codec circuitry of audio device 250 to handle processing of voice or data signals. Still further, audio device 250 may interface with VoIP circuitry 230 to provide a VoIP connection using audio device 250 and VoIP circuitry 230. In such embodiments, both VoIP circuitry 230 and audio device 250 may include hardware identifiers as described herein. In one implementation, modem portion 240 may be adapted in a separate IC, and incorporation of the full-featured IC 225 can be avoided. In such an implementation, a separate SLIC device, such as a SLIC including circuitry to provide minimal SLIC (e.g., BORSCHT) functions, may be coupled to audio device 250.

Figure 4:
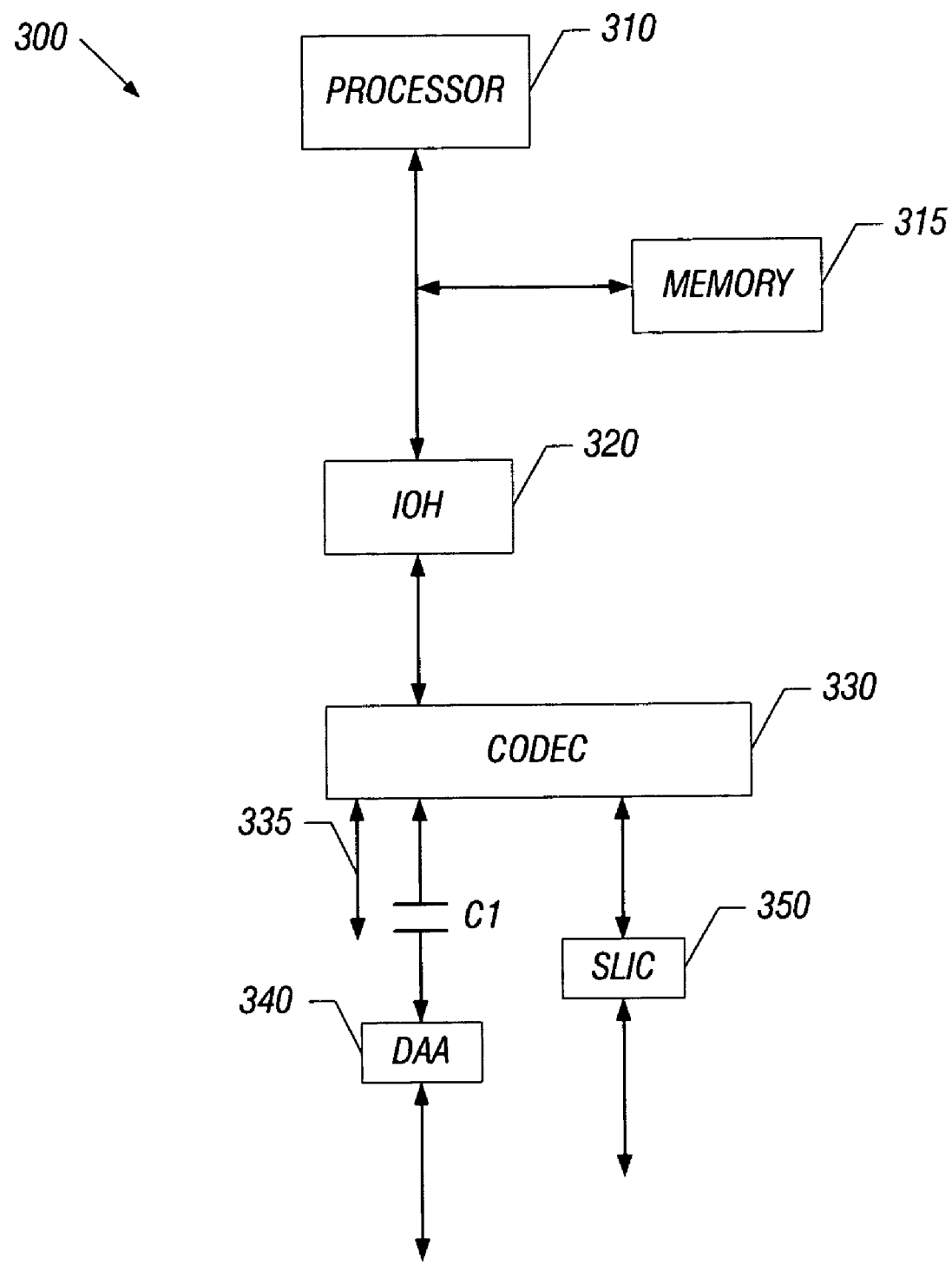
FIG. 4 is a block diagram of a system in accordance with yet another embodiment of the present invention.

Still further implementations are possible. Referring now to FIG. 4, shown is a block diagram of a system in accordance with yet another embodiment of the present invention. As shown in FIG. 4, system 300 includes a processor 310 coupled to a memory 315 and an I/O hub 320. In turn, I/O hub 320 is coupled to a codec 330. Codec 330 may be a separate IC to perform analog-to-digital and digital-to-analog conversion functions. Furthermore, in many implementations codec 330 may be a high-quality codec to provide 16-bit functionality, and may be particularly suited to multi-channel operations. Accordingly, codec 330 may interface with various other components including, for example: modem functionality via a capacitive coupling C1 to a DAA 340; and voice functions, e.g., VoIP functionality via a SLIC 350, which may be a SLIC including minimum SLIC functionality. Still further, codec 330 may be coupled to an audio path 335 to provide audio input/output communication. To ensure that software associated with various functions, e.g., the VoIP functionality, soft modem functionality among other such functions is used only in authorized systems, one or more of codec 330, DAA 340, and SLIC 350 may include storage for one or more hardware identifiers.

Figure 5:
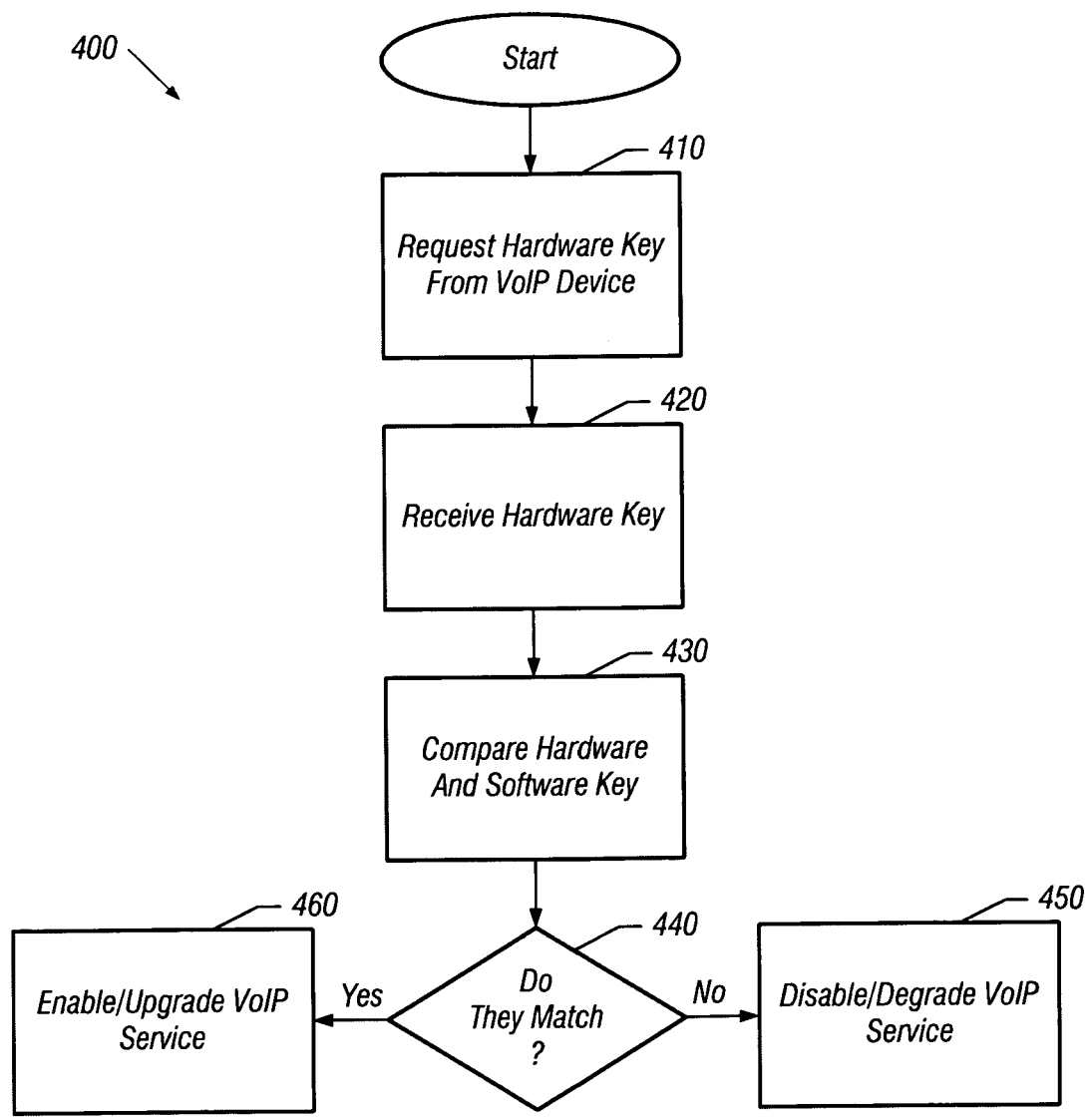
FIG. 5 is a flow diagram of a method in accordance with one embodiment of the present invention.

Referring now to FIG. 5, shown is a flow diagram of a method in accordance with one embodiment of the present invention. Method 400 may be used to protect VoIP software of a system. Specifically, method 400 may be used to associate a given instance of a VoIP software application with a particular hardware platform. In such manner, an unauthorized user of the software, for example, a user of a system including an unauthorized software version cannot access VoIP service or is afforded only degraded VoIP service. As shown in FIG. 5, method 400 may begin by requesting a hardware key from a VoIP device (block 410). For example, a VoIP application, e.g., a VoIP driver may request a hardware key from a SLIC that performs VoIP functionality. Upon receipt of the request, the VoIP device may access a hardware identifier that is stored in the device. In implementations in which multiple different hardware components are used to provide VoIP functionality, the application may request hardware identifiers from each of the components, and independently verify these keys, as described further below. The hardware identifier may be a unique code stored in a particular register or memory location within the device, e.g., memory 40 of FIG. 1.

The hardware identifier may take different forms in different embodiments. For example, different hardware identifiers may be based on differentiated packaging techniques (i.e., bond option), a one-time programmable (OTP) memory, or a particular silicon design. In some embodiments the hardware identifier may be programmable via on-chip programmable circuitry. In one embodiment the programmable circuitry may be a read-only memory such as an EEPROM. Furthermore, the identifier may include various information segments to provide different identification information including, for example, vendor information, configuration information, system information for a system in which the device is located, among other such information. This information may be used in connection with selecting and downloading supplemental software, such as additional drivers, updates and the like, in addition to security verification. Of course, multiple hardware identifiers may be present for use such as described below. Thus while FIG. 5 describes an embodiment in which only a single key is requested, it is to be understood that the scope of the present invention is not so limited.

Referring back to FIG. 5, the device may send the hardware key to the requesting application. Thus, the hardware key may be received at a system component handling the verification (block 420). For example, a processor executing the VoIP software may receive the hardware key via a hub interface which in turn is coupled to the VoIP device.

Next, the VoIP software may compare the hardware key to a software key (block 430). For example, this software key may be a unique identifier that associates the particular instance of the software with the platform with which it was initially associated. Thus it may be determined whether there is a match between the keys (diamond 440). If not, VoIP service may be disabled or degraded (block 450). Furthermore, in some embodiments upon a mismatch between the keys indicative of an illegal software version, the system may be controlled to send a message, e.g., via the Internet or even the VoIP service, to the software vendor to inform the vendor of the illegal copy (which is not shown in FIG. 5).

However if at diamond 440 it is determined that a match is present, VoIP service may be enabled and/or upgraded (block 460). For example, if the software is the correct instance associated with the correct hardware platform, upgraded VoIP services such as special call features, data services, or the like may be enabled. Note that while FIG. 5 shows comparison of a single hardware and software key, in some implementations multiple such keys may be compared. That is, a first hardware and software key may be compared to determine whether base software present in the system is an authorized copy such that base functionality of the protected device is enabled. Additional keys may then be compared to determine whether one or more upgrades or additional software features present in the system are also authorized copies. If so, the additional features or upgrades provided by this software may also be enabled. Thus using multiple keys in accordance with an embodiment of the present invention, functionality of a system, e.g., VoIP functionality or other such functionality may be updated in the field by downloading of additional software that includes one or more software keys for matching up with hardware keys already present in the system, such as previously unallocated hardware identifiers present in the same storage as the base hardware identifier. While shown with this particular implementation in the embodiment of FIG. 5, it is to be understood that the scope of the present invention is not so limited and in other embodiments, different manners of protecting VoIP software to be enabled only with a specific hardware platform may be implemented.

Figure 6:
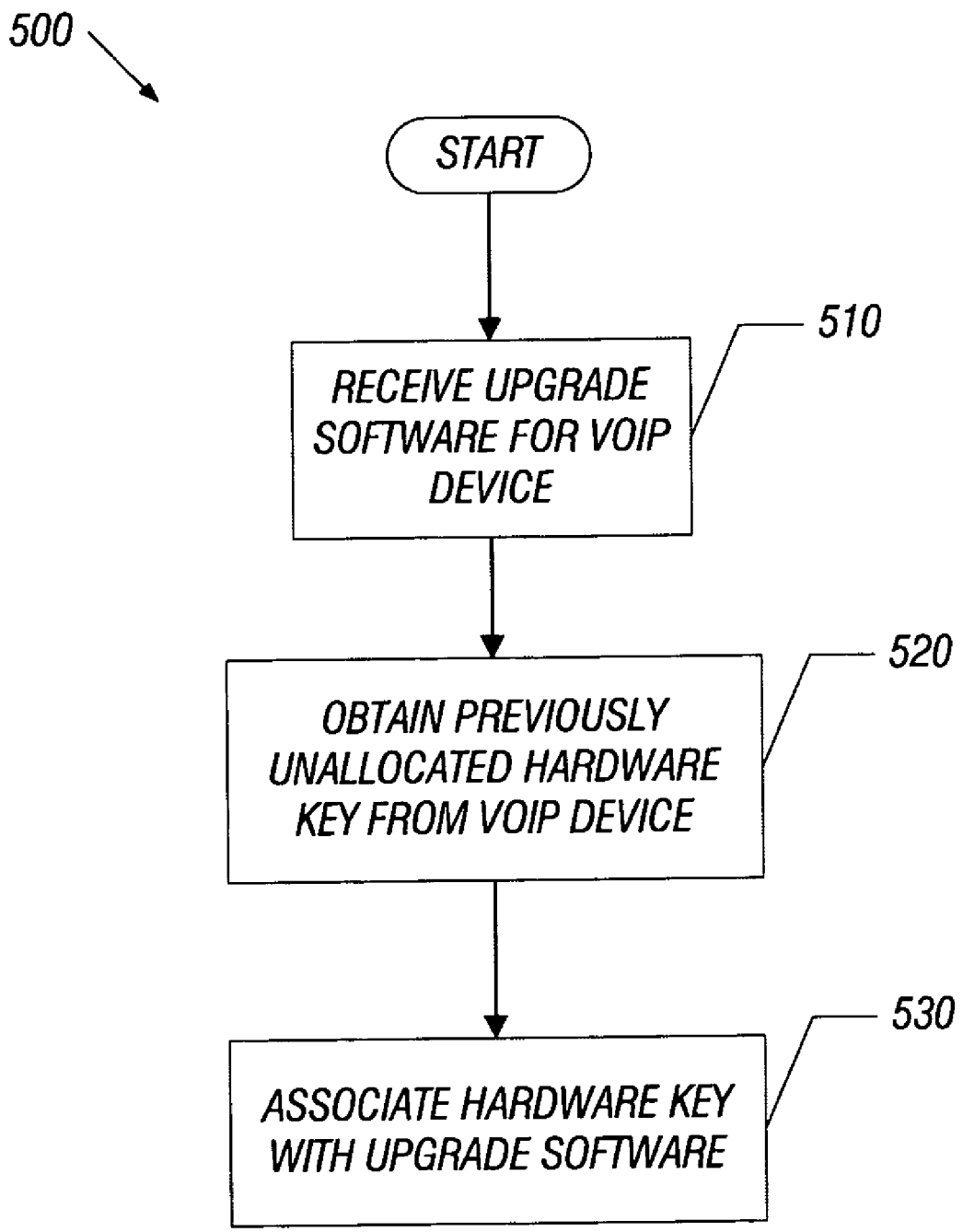
FIG. 6 is a flow diagram of a method in accordance with another embodiment of the present invention.

Referring now to FIG. 6, shown is a flow diagram of a method in accordance with another embodiment of the present invention. As shown in FIG. 6, method 500 may be used to upgrade software in a system. More specifically, method 500 may perform upgrades of VoIP functionality or other functionality present in a system. Such software upgrades may be obtained in various manners, e.g., via the Internet or another computer network, other software downloads, via a computer-readable medium or in another such manner. Accordingly, with reference to FIG. 6, a system may receive upgrade software for a VoIP device (block 510). The upgrade software may include code to obtain a previously unallocated hardware key from a VoIP device associated with the system (block 520). For example, an IC including SLIC functionality may include multiple hardware identifiers that are programmed into the IC at manufacture. One of the hardware identifiers may be a base identifier that is used in initial enabling of VoIP functionality and further to enable VoIP operations during normal system use. This identifier is thus associated with a VoIP application program at initial system configuration. One or more additional hardware identifiers may be programmed at manufacture to be used for purposes of future upgrades. Such identifiers thus may be unallocated at initial system configuration. Then, when instructed by the upgrade software, the VoIP device may send one or more of these previously unallocated hardware identifiers to the requesting software.

Still referring to FIG. 6, next the upgrade software may associate at least one of these previously unallocated hardware keys with itself (block 530). For example, the software upgrade may associate a software key of the upgrade software with the one or more previously unallocated hardware keys. The association may take different forms including setting the software key to be the same as the unallocated hardware key. In other implementations, an association in a table may be made between the software key of the upgrade software and the hardware key.

In this way, the upgrade software may be enabled as desired. Specifically, during operation, when the requested functions are initiated, the upgrade software may be authenticated as described above with reference to FIG. 5. Accordingly, in addition to comparing hardware and software keys of the base configuration, hardware and software keys of the upgrade software may also be compared to confirm its presence. When such confirmation is made enhanced features of an upgrade or additional features and functionality may be enabled. While described in this particular manner in the embodiment of FIG. 6, it is to be understood that the scope of the present invention is not limited in this regard.

The methods described herein may be implemented in software, firmware, and/or hardware. A software implementation may include an article in the form of a machine-readable storage medium onto which there are stored instructions and data that form a software program to perform such methods. As an example, a processor may include instructions or may be programmed with instructions stored in a storage medium to perform software validation in accordance with an embodiment of the present invention.

Using a key protection method, such as that described above for methods 400 and 500, embodiments may provide for greater protection of a software application, e.g., a VoIP application. Such protection may be particularly suited to a VoIP application that is configurable for use in different VoIP arrangements, in other words, where the VoIP application is not tied to a particular hardware solution or dedicated hardware/software package. Accordingly, suitable software protection may be provided, while allowing configurability of the VoIP application to many different types of platforms that may implement VoIP telephony using many different types of hardware.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    executing an application on a computer system to perform voice over Internet protocol (VoIP) telephony;
    requesting a hardware key stored in and for a line interface device including a subscriber line interface circuit of the computer system;
    comparing the hardware key to a software key that associates an instance of the application with the computer system with which it was initially associated;
    enabling the VoIP telephony if the hardware key and the software key match; and
    associating a second hardware key of the line interface device with upgrade software, wherein the second hardware key is unallocated after initial configuration of the computer system and not associated with any software after the initial configuration; and
    enabling upgraded VoIP telephony if the second hardware key and the upgrade software are associated.

2. The method of claim 1, further comprising preventing the VoIP telephony if the hardware key and the software key do not match.

3. The method of claim 1, wherein executing the application comprises executing a soft VoIP program on the computer system.

4. The method of claim 3, further comprising requesting the hardware key from the line interface device, wherein the line interface device is integrated within the computer system.

5. The method of claim 3, further comprising requesting the hardware key via a hub interface of the computer system coupled to the line interface device, wherein the line interface device is affixed to a motherboard of the computer system.

6. The method of claim 1, further comprising enabling degraded VoIP telephony if the hardware key and the software key do not match.

7. The method of claim 1, further comprising performing data transmission via modem circuitry of the line interface device if the VoIP telephony is enabled.

8. The method of claim 7, further comprising executing an audio application on the computer system via codec circuitry of the modem circuitry.

9. A subscriber line interface circuit (SLIC) comprising:
   a codec to code and decode voice data for voice over Internet protocol (VoIP) telephony;
   a line interface to interface the SLIC to a connection for the VoIP telephony; and
   a non-volatile storage to store at least one hardware identifier for the SLIC and to provide the at least one hardware identifier upon a request from a VoIP application program of a computer system, wherein the SLIC is adapted within the computer system, and the non-volatile storage includes a first hardware identifier associated with the VoIP application program and a second hardware identifier that is unallocated after initial system configuration and not associated with any software after the initial system configuration.

10. The SLIC of claim 9, further comprising a modem and a data access arrangement (DAA) for data communication, wherein the modem, the codec and the line interface are integrated on a single substrate.

11. The SLIC of claim 10, wherein the codec is to further code and decode audio data of an audio channel.

12. The SLIC of claim 9, wherein the second hardware identifier is to thereafter be associated with upgrade software loaded into the computer system.

13. An article comprising a non-transitory machine-accessible medium including instructions that when executed cause a system to:
   request a first hardware identifier from a first component, the first component including subscriber line interface circuitry (SLIC), the first hardware identifier stored in a non-volatile memory of the first component;
   compare the first hardware identifier to a first soft identifier that associates an instance of a voice over Internet protocol (VoIP) application program with the system with which it was initially associated;
   provide a first level of VoIP telephony if the first hardware identifier and the first soft identifier correspond and a second level of the VoIP telephony if the first hardware identifier and the first soft identifier do not correspond; and
   associate a second soft identifier for an upgrade program with a second hardware identifier stored in the non-volatile memory of the first component, wherein the second hardware identifier was unallocated after initial configuration of the system and was not associated with any software.

14. The article of claim 13, wherein the first level of VoIP telephony comprises an upgraded level and the second level of VoIP telephony comprises a degraded level.

15. The article of claim 13, further comprising instructions that when executed cause the system to send a message to a remote entity if the first hardware identifier and the first soft identifier do not correspond.

16. The article of claim 13, further comprising instructions that when executed cause the system to request a second hardware identifier from a second component, the second component including codec circuitry, the second hardware identifier stored in a non-volatile memory of the second component.

17. The article of claim 16, further comprising instructions that when executed cause the system to perform the VoIP telephony using the SLIC of the first component and the codec circuitry of the second component if the first and second hardware identifiers correspond to the first soft identifier and the second soft identifier, respectively.

* * * * *